United States Patent [19]
Siciliano

[11] Patent Number: 5,988,470
[45] Date of Patent: Nov. 23, 1999

[54] QUICK RELEASE AND CAR ROOF RACK SYSTEM

[76] Inventor: Paul Siciliano, 7 Jennifer Ave., North Caldwell, N.J. 07006

[21] Appl. No.: 09/020,350

[22] Filed: Feb. 9, 1998

[51] Int. Cl.⁶ .................................................. B60R 9/042
[52] U.S. Cl. ........................ 224/310; 224/324; 224/924; 414/462
[58] Field of Search .................................. 224/310, 324, 224/924; 414/462

[56] References Cited

U.S. PATENT DOCUMENTS

| | | | |
|---|---|---|---|
| 3,452,893 | 7/1969 | Heflin | 414/462 |
| 3,931,919 | 1/1976 | Gerber et al. | 224/324 |
| 4,728,244 | 3/1988 | Stokkendal | 414/462 |
| 4,826,387 | 5/1989 | Audet | 224/310 |
| 5,058,791 | 10/1991 | Henriquez et al. | 224/310 |
| 5,360,150 | 11/1994 | Praz | 224/310 |
| 5,544,796 | 8/1996 | Dubach | 224/310 |

*Primary Examiner*—Linda J. Sholl
*Attorney, Agent, or Firm*—Donald R. Heiner, Esq.

[57] ABSTRACT

A system which allows a person to easily access an automobile roof rack attachment for holding and carrying a bike or other object such as a canoe employing a telescoping mechanism for moving the carried object out beyond the roof line of the vehicle wherein the system also has a parallelogram mechanism allowing the user to also lower the system carrying the bike or other object parallel to the ground during its movement into a locked position beyond the roof line of the vehicle. By manually pulling downwardly on the parallelogram mechanism the system is lowered to a comfortable level. Once in this position the person attaches the bike or other equipment to the system, the system is unlocked, and the raises up manually to the rooftop level and then pushed inward toward the center of the automobile into its resting and locked position.

9 Claims, 7 Drawing Sheets

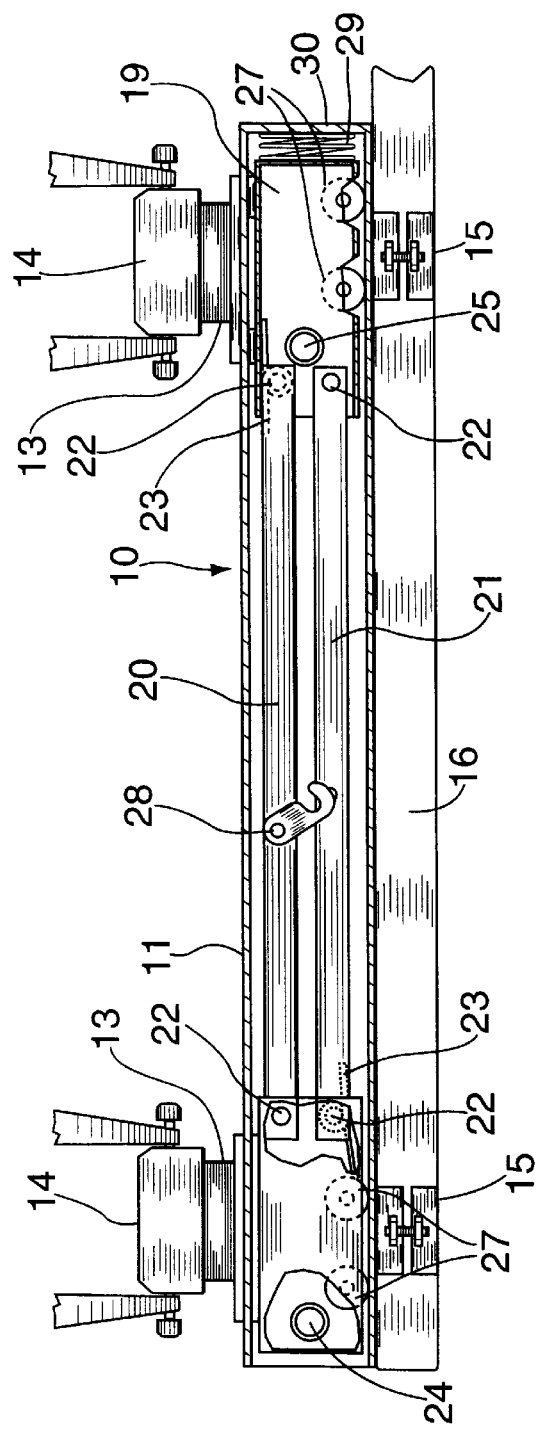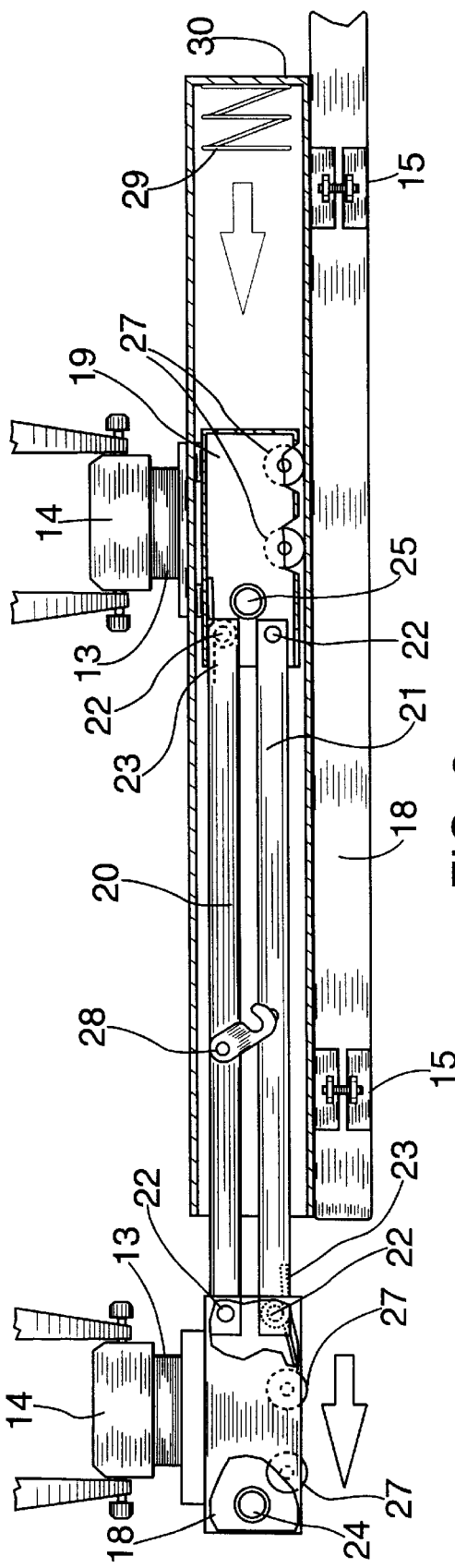

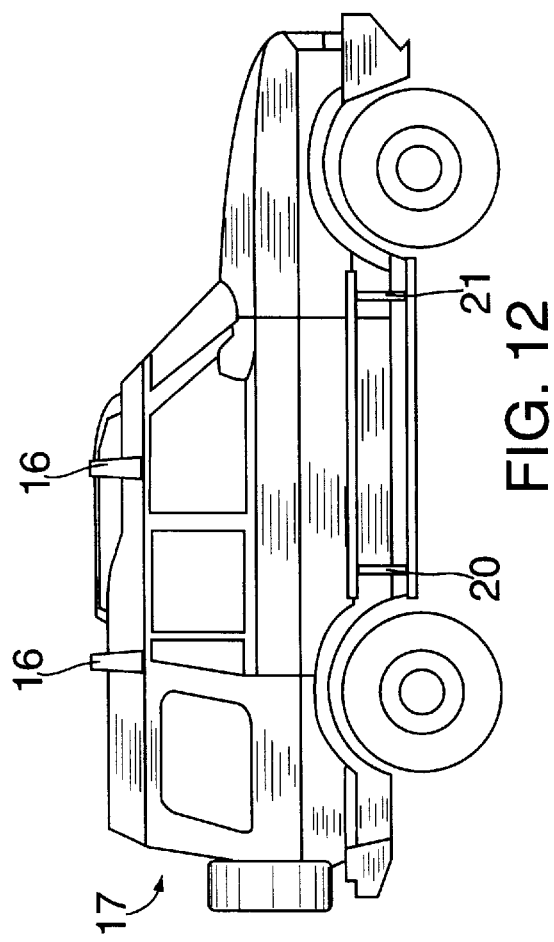
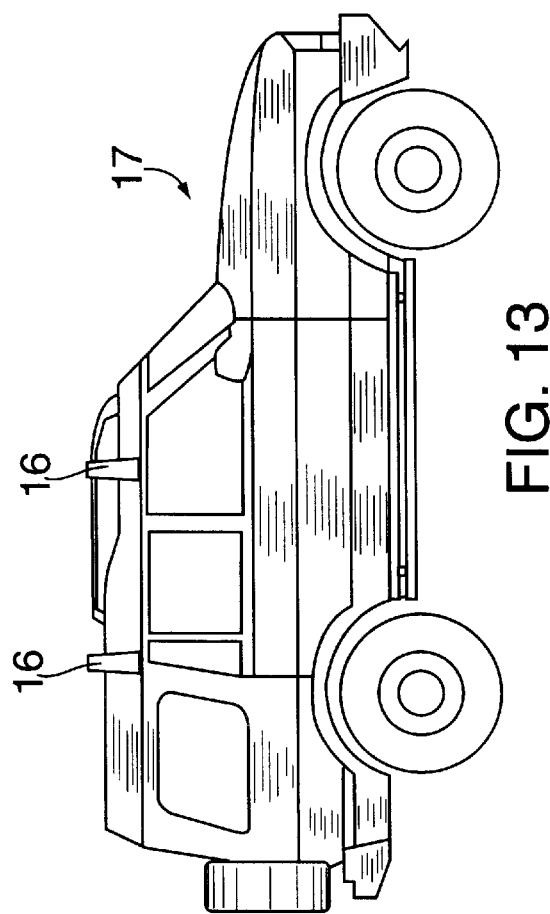
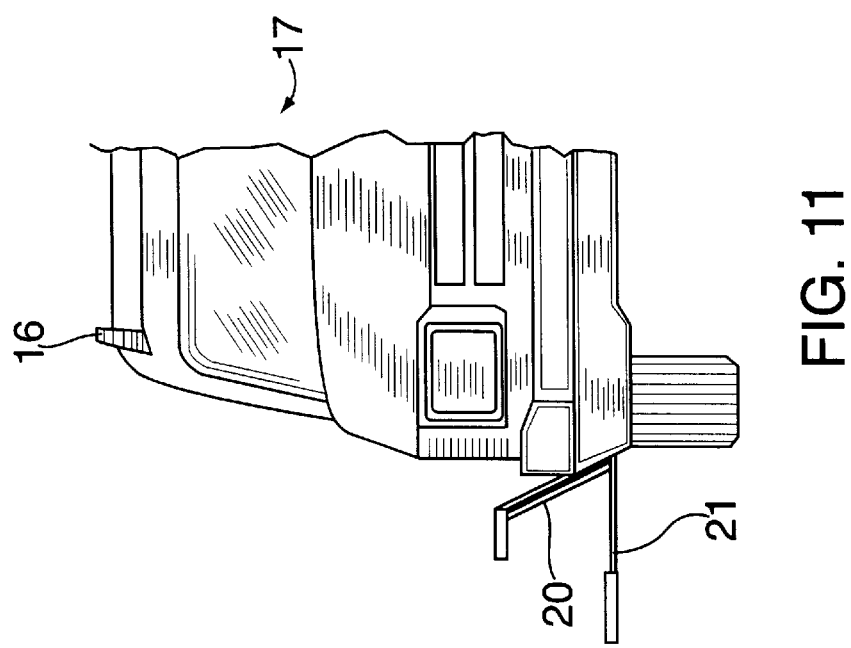

QUICK RELEASE AND CAR ROOF RACK SYSTEM

BACKGROUND OF INVENTION

1. Field of the Invention

The present invention generally involves the field of technology pertaining to a device to be used in conjunction with an automobile roof rack carrying device which carries a bike, ski, snowboard, kayak, canoe, etc. Essentially, the device comprises a mechanical mechanism which telescopes for moving a roof rack carrier outwardly of the vehicle, beyond the roof line of the vehicle, and towards either the driver or passenger side door. That same system is also a parallelogram which, in addition to the foregoing, also allows the operator to not only move the mechanism outwardly but also allows the operator to lower that same rack system to an easily accessible level by manually pulling it down. Still further, the entire roof rack system can be moved downwardly to ground level and then into a locked position.

In that position, the roof rack is loaded, the operator unlocks the system, the device is manually raised, and then the operator pushes the system back to its original position at the center of the vehicle into a resting and locked position.

The entire mechanism disclosed herein is housed within a rectangular tube and wherein the rectangular tube has a channeled top.

The device disclosed herein attaches to a standard automobile bar rack such as a THULE® by way of bar clamps to be more fully described. In turn, mounting brackets attach a THULE® Fork Mount to the device described herein.

2. Description of the Prior Art

A search of the prior art has uncovered the following patents: U.S. Pat. No. 3,452,893 to K. C. Heflin; U.S. Pat. No. 5,544,796 to Dubach; U.S. Pat. No. 4,728,244 to Stokkendal; U.S. Pat. No. 3,931,919 to Gerber, et al.; and U.S. Pat. No. 5,058,791 to Henriquez, et al.

The patent to Heflin U.S. Pat. No. 3,342,893 appears to be the most relevant and relates to a "Cargo Carrying and Loading Apparatus for use on a Vehicle Roof". In this patent extension tracks have a curvilinear portion adjacent at top ends which sideably receive roof tracks and extension tracks. These extension tracks are merely coupled to the roof tracks when it is desired to place a load on a dolly which is moveable along a track system between a loading and unloading position at the ground adjacent to the automobile.

The Dubach U.S. Pat. No. 5,544,796 which discloses a roof rack equipped with two parallel tracks having a roof section and a pivotal auxiliary section. In this patent, similar to the Heflin patent described above, the roof section and the auxiliary section form a continuous track for the carriage wherein the only movement during loading is the relative movement between the carriage and the track.

The patent to Stokkendal, U.S. Pat. No. 4,728,244 is a Combined Roof Rack for a Car and Two-Wheel Cart. In this patent it is stated that "It is thus not necessary to lift heavy or unmanageable parcels up onto a car rack which is permanently attached to the car top. Bringing the rack onto the car top is quite simple and easy. One lifts the rack up at an incline, inwards over the car top, with an appropriate lifting motion using a straight back."

The patent to Gerber, et al., U.S. Pat. No. 3,931,919 relates to a Bicycle Carrier for Automobiles and does not disclose a device for moving the rack either horizontally or vertically which, is the essence of the invention contained herein.

The patent to Henriquez, et al., U.S. Pat. No. 5,058,791 relates to a Vehicular Ladder Rack having a "stationary mounting frame" and a pair of transverse frame members affixed to the roof of the vehicle.

Finally, the patent to Koop, U.S. Pat. No. 4,376,611 is a Car Top Carrier for a Wheelchair. That is its only function. Structurally and mechanically there is no relevancy between this patent and the invention disclosed herein.

It would appear that the closest references are the patents to Heflin and Dubach, but neither reference taken by itself nor combined with each other disclose the instant invention.

None of the above references teaches or even suggests the use of the unique combination of a telescopic mechanism for moving a roof rack accessory out beyond the roofline of a vehicle in combination with a parallelogram mechanism which allows the user to also lower the roof rack system to a comfortable level by manually pulling it down and which also allows the user to lower the roof rack accessory system perpendicular to the ground throughout its movement into a locked position.

SUMMARY OF THE INVENTION

According to the present invention there is provided a system which enables a person to quickly, effortlessly, and safely access an object such as a bike, ski, snowboard, kayak, canoe, etc. carried on the roof of an automobile. The device disclosed herein comprises a telescopic mechanism for moving an object carried on the roof of an automobile outwardly beyond the roof line of the automobile and parallel to the ground. Once the object is beyond the roof line a mechanism, comprising a parallelogram, further allows the user to lower the device to a convenient level by simply pulling it down. Once the device is opened and lowered the object, such as a bike, which was being carried on the roof of the vehicle, several feet off the ground, and a foot of so towards the center of the vehicle, now is in a position along the side of the automobile doors, passenger or driver side, at a level whereby an operator can load or unload the device and then unlock the device whereby it is allowed to raise up manually to the rooftop level at which point the device can be pushed back toward the center of the vehicle into a resting and locked position.

It is therefore an object of the present invention to provide a telescopic mechanism for moving a roof rack assembly out beyond the roof line of a vehicle.

It is another object of the invention to provide a roof rack accessory system comprising a parallelogram mechanism allowing an operator to easily lower the system to a comfortable level by manually pulling it down.

It is a further object of the invention to provide such a system wherein the device is parallel to the ground throughout its movement into a locked position.

It is still a further object of the invention to provide such a device whereby when an operator unlocks the system it manually raises up at which point it is pushed back toward the center of the vehicle into a resting or locked position.

Employing the same principals as indicated above, another application of the device or invention is a running board for the vehicle which can be moved out telescopically and then raised upwardly through the use of the same parallelogram mechanism. Such a system would allow the operator to step up onto the running board thereby easily accessing objects stored upon the automobile roof.

These and further objects, features, and advantages of the invention shall become apparent from the following detailed description of a preferred embodiment thereof when taken in conjunction with the drawings wherein like reference characters refer to corresponding parts in the several views.

BRIEF DESCRIPTION OF THE DRAWINGS

FIG. 1 is a cross-sectional view showing the device in a closed position as viewed from the front of the vehicle.

FIG. 2 is the same as FIG. 1 but showing the device in an open position.

FIG. 11 is a pictorial front view of one-half of an automobile showing the alternate embodiment of the parallelogram employing a running board.

FIG. 12 is a pictorial side view of an automobile showing the alternate embodiment of the running board set-up.

FIG. 13 is a pictorial side view similar to FIGS. 11 and 12 but showing the running board device in a stored position.

DETAILED DESCRIPTION OF THE PREFERRED AND ALTERNATE EMBODIMENT

Figure 3:
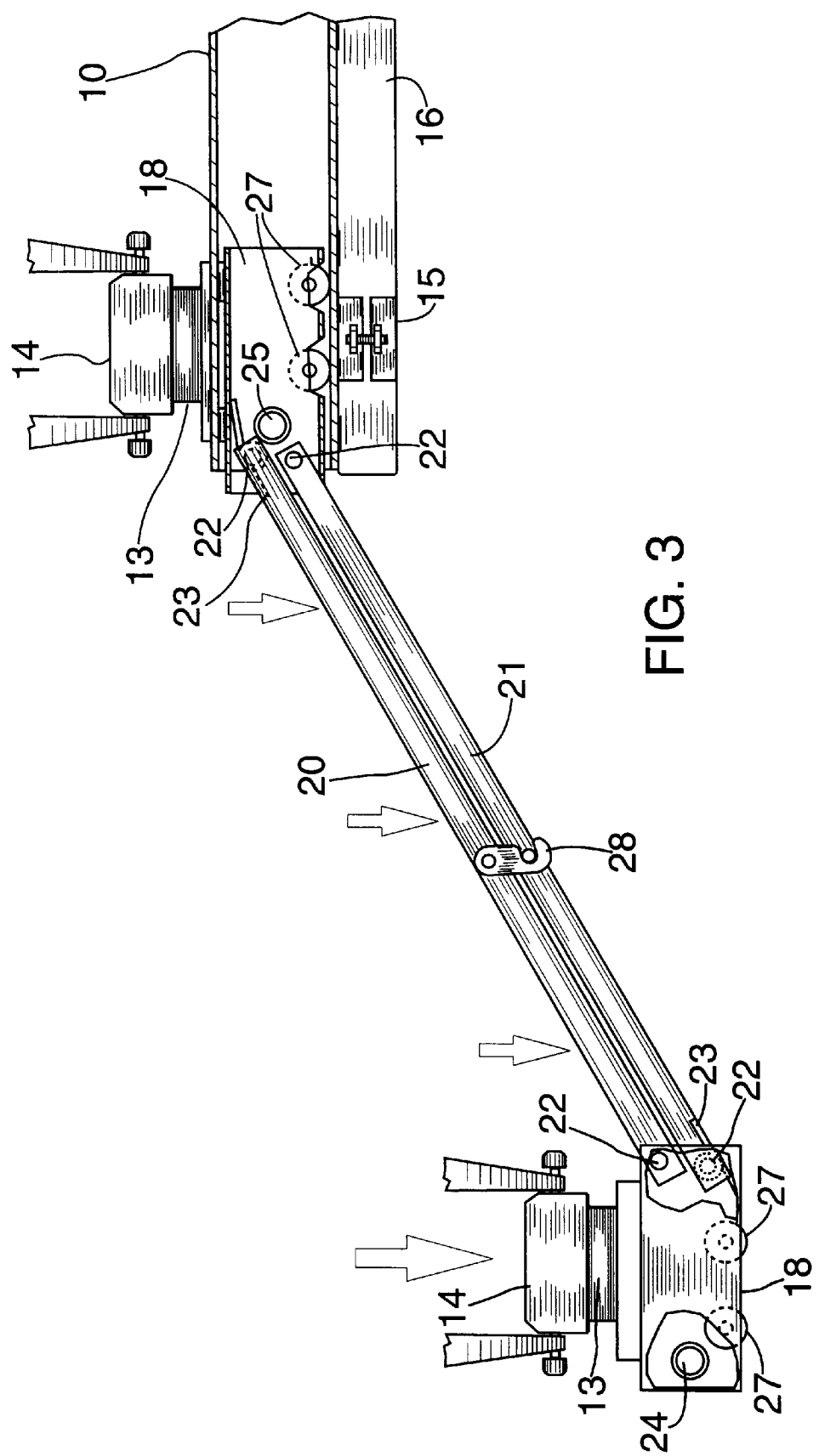
FIG. 3 depicts the device of FIGS. 1 and 2 in an open, extended, and lowered position.

A device that enables a person to quickly, effortlessly, and safely have access to an automobile roofrack accessory carrier whereby the device comprises both a telescopic mechanism for moving a carried object, such as a bike, toward the center of and away from the vehicle and wherein such telescopic system is spring loaded for easily opening and closing the device and wherein the device further comprises a parallelogram mechanism for allowing the operator to raise and lower the device for loading and unloading will now be described with reference to FIGS. 1–10d of the drawings and wherein an alternate embodiment comprising an automobile running board will be described with reference to FIGS. 11–13.

The device comprising the instant invention is disposed between a standard THULE® or the like, bar rack which extends laterally over the roof of an automobile and perpendicular to the longitudinal access thereof and a carrier which holds, and transports, on top of the automobile, any well known object such as a bike, skis, kayak, canoe, etc. The bar rack is attached to the automobile roof by any well known means and the device of the instant invention is attached to the bar rack by means of bar clamps or any other well known fastening device. In turn, mounting brackets secure an object carrier to the top of the instant invention disclosed herein. In the description of this invention the carrier is shown as a THULE® Fork Mount for a bicycle although it should be clearly understood that not only a Fork Mount other than a THULE® may be used but also that the carrier maybe something other than a Fork Mount for a bicycle.

It should be understood that the roof rack, the carrier, and the object carried by the carrier, are all well known devices as is any object to be carried on the carrier by the automobile.

The device itself is shown generally at 10 and in general is in the shape of a rectangular box which is open at one end which can be either on the driver's side or on the passenger's side of an automobile. In this case it is shown on the passenger side. The top 11 of rectangular box 10 has a channel 12 formed therein for slideably receiving mounting brackets 13 which in turn are attached to and hold a carrier 14 which is shown here as a bicycle fork mount. Any other type of suitable carrier may be used depending upon the object to be transported such as skis, a snowboard, a canoe, etc.

A bar clamp or any other well known fastening device 15 secures the rectangular box 10 to a bar rack 16 and to the roof of the automobile shown generally as 17. The bar rack extends transversely of the automobile from side-to-side.

Disposed within rectangular box 10 are two smaller rectangular boxes, outside hinge housing 18 and inside hinge housing 19. The outside and inside relate to the position of the hinge housing relative to rectangular box 10 after the system is deployed as more fully explained below.

The mounting brackets 13 previously discussed are attached to the outside and inside hinge housings 18 and 19 respectively and, again, as previously discussed, the carrier 14 is attached to the mounting brackets. Therefore, as will be discussed below, the carrier, mounting bracket, and hinge housing move together as one unit.

The carriers slideably move in channel 12 to more easily facilitate movement of the carriers as they are, as previously discussed, attached to and slide with or move with hinge housings 18 and 19.

Figure 6:
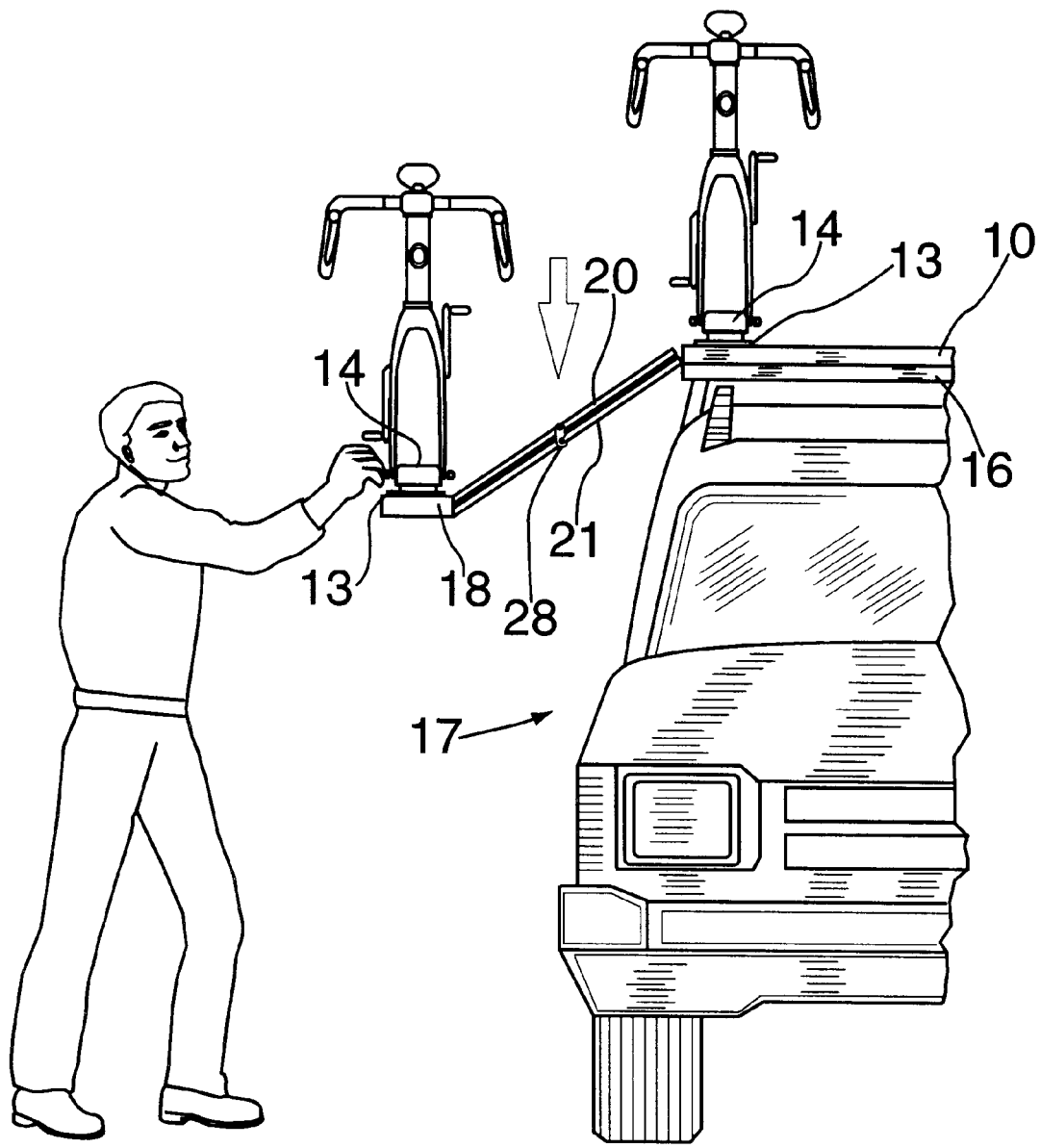
FIG. 6 is similar to FIG. 5 but further showing the device in a lowered position for easy loading and unloading.

A parallelogram mechanism comprises longitudinally extending tubular members 20 and 21 which are parallel to each other and spaced apart with each having one end attached to each of the outside and inside hinge housings 18 and 19 by means of hinge pins 22 or any other well known fastening device all as best seen in FIGS. 2, 3, and 6.

The hinge pins 22 shown here are springs disposed about pins that extend through and inside tubular members 20 and 21.

When the device comprising this invention is in its retracted and closed position the longitudinally extending tubular members 20 and 21 are disposed within rectangular box 10. When the system is deployed, as will be more fully discussed below, the tubular members forming the parallelogram are extended outwardly of rectangular box 10.

Figure 5:
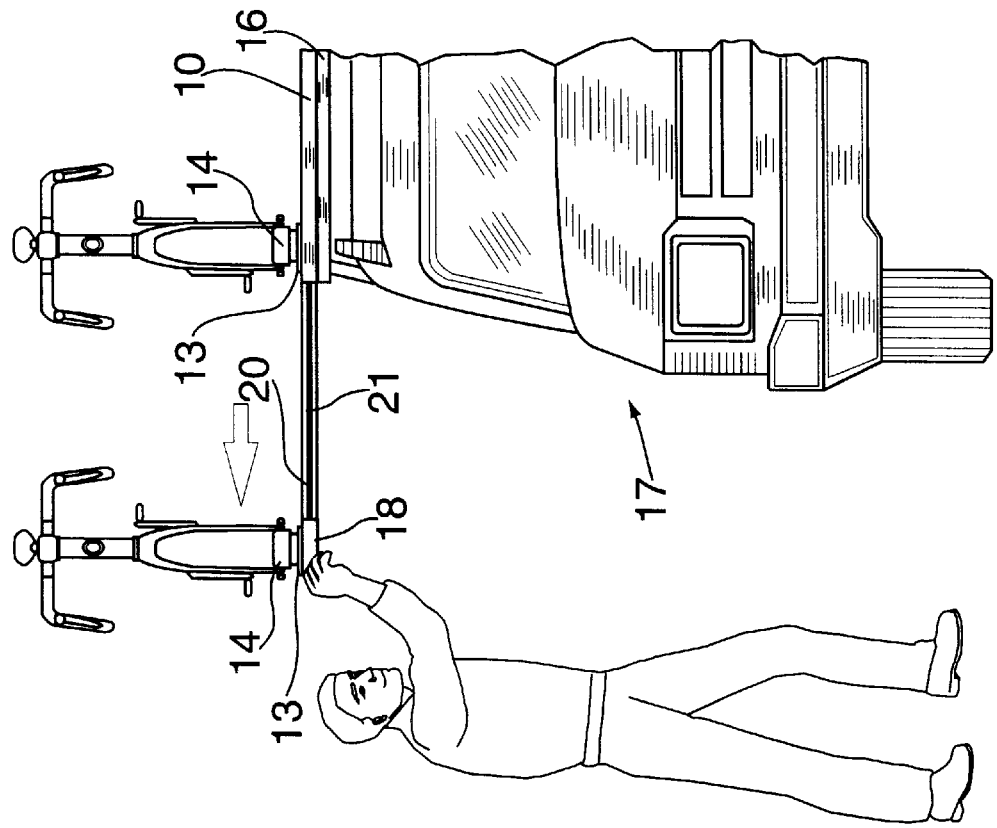
FIG. 5 is similar to FIG. 4 but showing the device in an open and extended position outwardly of the passenger side of the automobile.

Hinge pin springs 23 disposed about hinge pins 22 biased the parallelogram mechanism upwardly helping keep it in a horizontal position as best seen in FIGS. 2 and 5.

Figure 4:
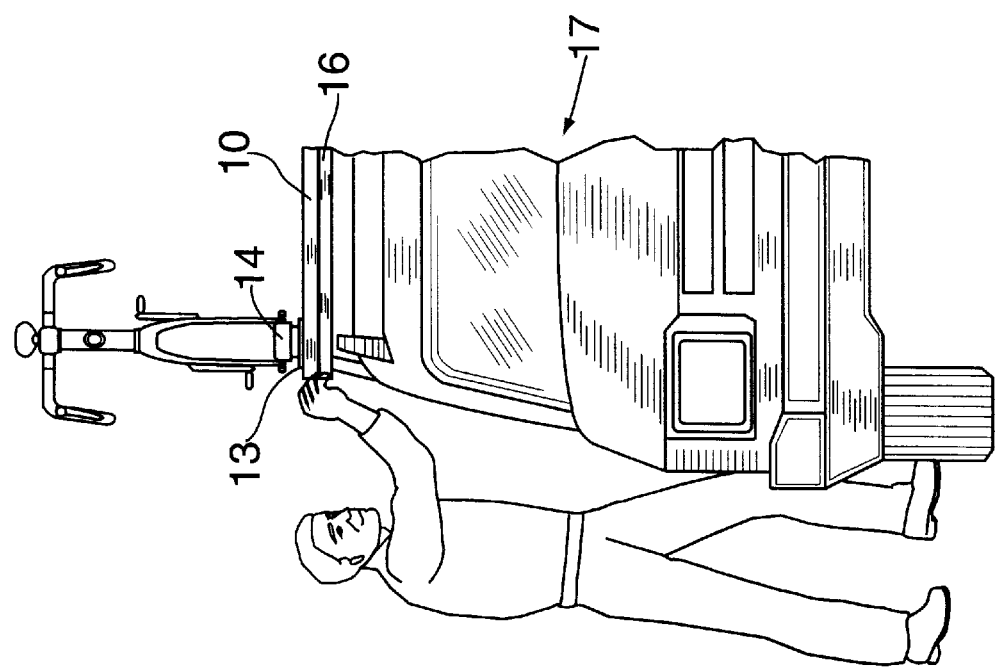
FIG. 4 is a pictorial of an automobile having the device mounted on the roof thereof in a closed and locked position.
Figure 10A:
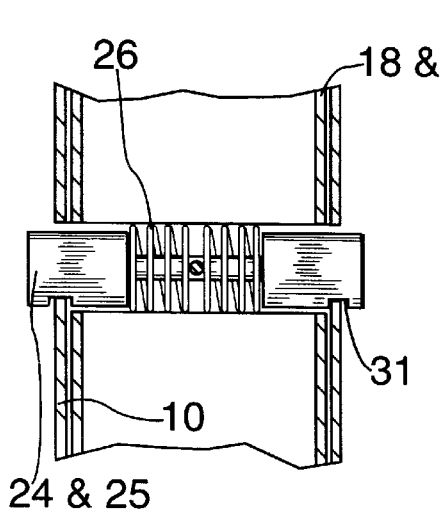
FIG. 10a is a cross-sectional top view of the rack latching mechanism of FIG. 9.
Figure 10B:
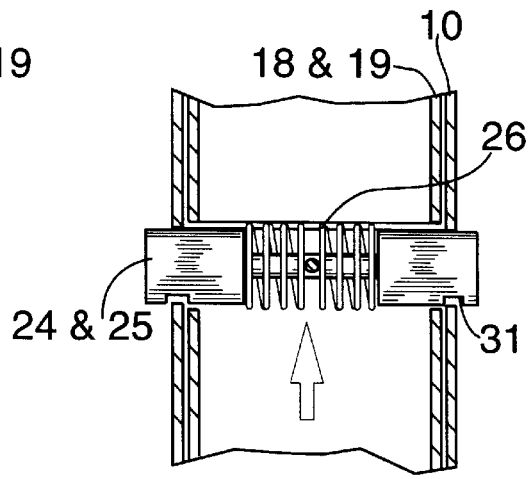
FIG. 10b is similar to FIG. 10a wherein an inner tube is pressed backwards against an outwardly biased spring at the back of the tube.

Front latching mechanism 24 and rear spring loaded latching mechanism 25 as best seen in FIGS. 1, 2, and 3 are attached respectively to the outside and inside hinge housings 18 and 19 whereby the front spring loaded latching mechanism 24 keeps the parallelogram mechanism locked in a closed position as shown in FIGS. 1, 4, and 10a. The rear spring loaded latching mechanism prevents the parallelogram mechanism from becoming disengaged from rectangular box 10 when the mechanism is extended outwardly as shown in FIG. 5.

Figure 9:
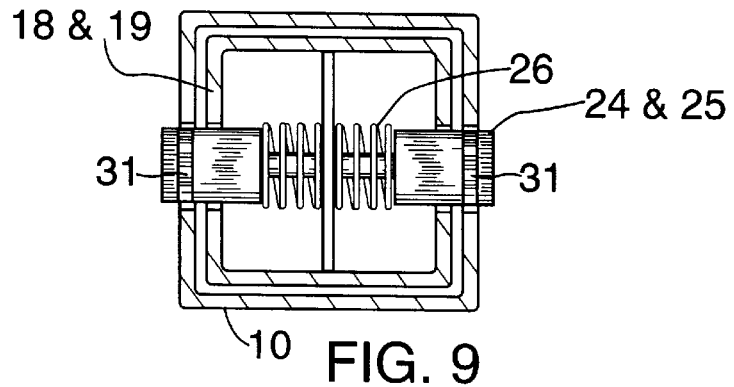
FIG. 9 is a cross-sectional end view of the rack latching mechanism.
Figure 10C:
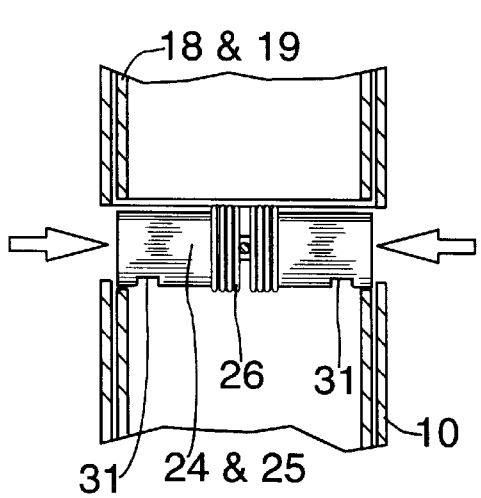
FIG. 10c is similar to FIGS. 10a and 10b but showing the spring loaded latch pressed inwardly causing an outward movement in FIG. 10d due to an outwardly biased spring at the back of the tube.
Figure 10D:
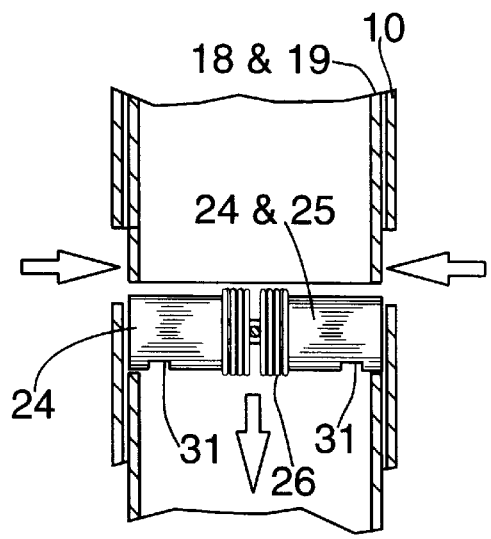

The operation of these spring loaded latching mechanism 24 and 25 are best seen in FIGS. 9–10d.

The latching mechanism spring 26 as seen in FIGS. 9–10d keeps the latching mechanism biased outwardly until depressed by an operator. This is as shown in FIG. 10c.

A plurality of rollers 27 are attached by any suitable means to the bottom of both the outside hinge housing 18 and inside hinge housing 19 to provide for easy sliding motion between the rectangular box 10 and the combination of the inside and outside hinge housing 18 and 19 and the longitudinally extending tubular members 20 and 21.

When the parallelogram system comprising longitudinally extending tubular members 20 and 21 are deployed outwardly of rectangular box 10 and lowered to the position shown in FIGS. 3 and 6 latch 28 it is engaged as shown to lock the parallelogram in its lowered position.

As seen only in FIGS. 1 and 2 a biasing means such as coil spring 29 is disposed in rectangular box 10 between an end wall 30 thereof and the back end of inside hinge housing 19 such that when latching mechanism spring 26 is depressed the biasing means or coil spring 29 exerts a force to move inside and outside hinge housings 18 and 19 and therefore longitudinally extending tubular members 20 and 21 and carriers 5 forwardly and outwardly of rectangular box 10.

As seen in FIGS. 10a–10d a safety notch is formed in spring loaded latching mechanisms 24 and 25 for alternately engaging and disengaging rectangular box 10.

It should be noted that FIGS. 9–10d depict both the front and rear spring loaded latching mechanisms 24 and 25 which are the same as each other.

However, it is only the front spring loaded latching mechanism that is depressed by the operator such as shown in FIGS. 4, 5, and 6.

In operation, the operator lightly pushes inwardly on outside hinge housing 18 to disengage safety notch 31 from rectangular box 10. Thereby allowing latching mechanism spring 26 to be depressed as shown in FIG. 10c thereby causing biasing means 29 to exert a force on inside hinge housing 19 thereby causing the inside and outside hinge housings 19 and 18 to move forward relative to rectangular box 10 on rollers 27. When the device is fully deployed the rear spring loaded mechanism and latching mechanism spring 26 will snap out and its safety notch 31 will engage the outer rectangular box 10 to prevent further forward movement of inside hinge housing 19 so that it does not become disengaged from rectangular box 10.

Figure 8:
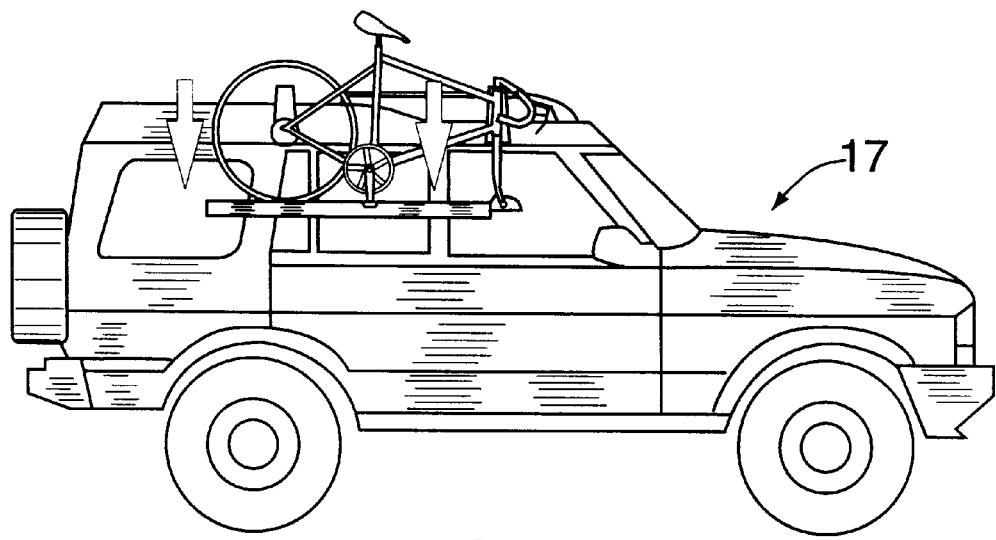
FIG. 8 is the same as FIG. 7 but showing the device and therefore the bicycle in an extended and downward position.

As best seen in FIGS. 3, 6, and 8 an operator can then pull downwardly against the bias of hinge pin springs 23 and then engage latch 28 as clearly seen in FIGS. 3 and 6.

At this lowered height of carrier 14 the operator can load or unload the object to be carried at this comfortable level.

After loading or unloading carrier 14 the operator slightly pulls downwardly, releases latch 28, and allows the hinge pin springs 23, by means of their bias, to allow the load to raise to an upright and horizontal position such as shown in FIGS. 2 and 5. The operator now slightly pushes on outside hinge housing 18 causing the hinge housings to roll inwardly by means of rollers 27 into rectangular box 10. The invention is now in the position as shown in FIGS. 1 and 4. The front spring loaded latching mechanism 24 and latching mechanism spring 26 now lock the system in a closed position as seen in FIGS. 1, 4, and 10a.

FIGS. 11–13 show an alternate embodiment or second application of the parallelogram system described above and using the same principals as stated above but wherein a running board of an automobile can be moved out telescopically and then raised upwardly through the use of such parallelogram. This embodiment would then allow the user to step up onto the running board and easily access all roof rack carried objects or luggage racks, etc.

Figure 7:
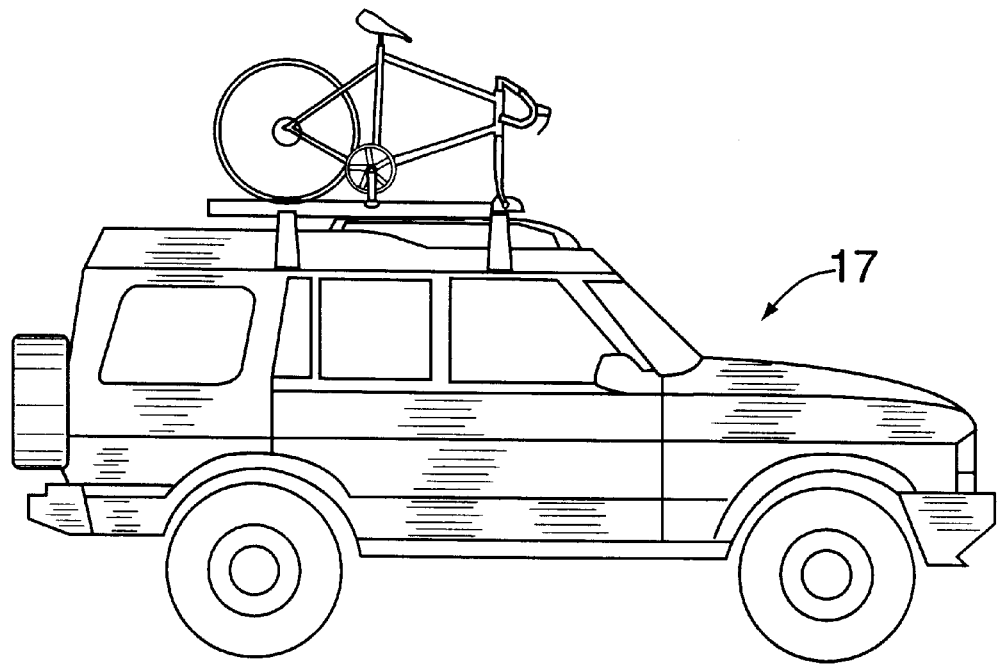
FIG. 7 is a pictorial of an automobile having the device mounted on the roof thereof and a bike mounted on the device.

It should be obvious that for each bar rack disposed on the automobile one of the devices disclosed herein would be needed. Thus, as seen in FIGS. 7 and 8, two such devices would be required to load and unload the object being carried.

Though the invention has been described and illustrated with reference to a preferred embodiment thereof those skilled in the art will appreciate the various changes and modifications in shape, size, composition, and arrangement of parts may be resorted to without departing from the spirit of the invention or scope of the subjoined claims.

What is claimed:

1. A device attachable to a roof rack bar mountable on the roof of an automobile which roof rack bar is adapted to carry and support an object to be transported by said automobile and wherein said device provides for easy access to load and unload said object from said roof rack bar wherein said device comprises:

(a) a generally rectangular shaped box having a top and one open end;

(b) means for attaching said roof rack bar to said rectangular box;

(c) a carrier for said object to be transported;

(d) means for attaching said carrier to said generally rectangular shaped box;

(e) an inside and an outside hinge housing disposed in said rectangular box;

(f) parallel and spaced apart longitudinally extending members attached at one end to said inside and another end attached to said outside hinge housing;

(g) means for attaching said longitudinally extending members to said inside and said outside hinge housings;

(h) a spring disposed about at least one of each of said means for attaching said longitudinally extending members to said hinge housings for biasing said longitudinally extending members and said outside hinge housing upwardly when they are deployed outwardly of said rectangular shaped box;

(i) a front and a rear spring loaded latching mechanism operatively associated respectively with said outside and said inside hinge housings for locking said device closed and preventing said inside hinge housing from becoming fully deployed from said generally rectangular shaped box respectively;

(j) a latching mechanism spring operatively associated with each of said front and rear spring loaded latching mechanisms for biasing said latching mechanisms outwardly until depressed by an operator;

(k) biasing means disposed in said rectangular box between an end wall of said rectangular box and said inside hinge housing for biasing said inside hinge housing forward of said rectangular box when said latching mechanism operatively associated with said outside hinge housing is depressed by an operator; and, (l) a safety notch disposed in each of said latching mechanisms for alternately engaging and disengaging said rectangular box when the operator presses on said front spring loaded latching mechanism thereby allowing said biasing means to move said inside hinge housing, said outside hinge housing, and said longitudinally extending members forwardly and outwardly of said rectangular box until said rear latching mechanism notch engages said rectangular box thereby preventing further forward motion at which time the operator pulls down on the outside hinge housing thereby lowering the said object to an easily reachable level for loading or unloading.

2. The device of claim 1 wherein said means for attaching said roof rack bar to said rectangular box are bar clamps.

3. The device of claim 2 wherein said means for attaching said carrier to the said generally rectangular shaped box are mounting brackets.

4. The device of claim 3 wherein said means for attaching said longitudinally extending members to said inside and said outside hinge housings are hinge pins.

5. The device of claim 4 wherein said biasing means disposed in said rectangular box for biasing said inside hinge housing forward is a coil spring.

6. The device of claim 5 wherein a channel is formed in the top of said rectangular box for slideably receiving said mounting brackets which are attached to and hold said carrier.

7. The device of claim 6 wherein a plurality of rollers are attached to the bottom of said outside and said inside hinge housings to provide sliding motion between said rectangular box, said inside and outside hinge housings, and said longitudinally extending members.

8. The device of claim 7 wherein a latch locks said parallel and spaced apart longitudinally extending members together to lock said device in a lowered position.

9. The device of claim 8 wherein said parallel and spaced part longitudinally extending members are tubular.

* * * * *